United States Patent [19]

Mumick et al.

[11] Patent Number: 5,751,798
[45] Date of Patent: May 12, 1998

[54] PASSIVE INFORMATION ACCESS SYSTEM

[75] Inventors: Inderpal Singh Mumick, Berkeley Heights; Abraham Silberschatz, Summit, both of N.J.

[73] Assignee: AT&T Corp., Middletown, N.J.

[21] Appl. No.: 527,241

[22] Filed: Sep. 12, 1995

[51] Int. Cl.⁶ ..................................................... H04M 15/00
[52] U.S. Cl. .................... 379/112; 379/114; 379/118; 379/122; 379/127; 455/407; 455/566
[58] Field of Search ..................... 379/111–114, 118, 379/120, 122, 127, 130, 142–143, 145, 58, 59; 455/406, 407, 412, 418, 414, 419, 422, 566, 550

[56] References Cited

U.S. PATENT DOCUMENTS

| | | |
|---|---|---|
| 4,799,255 | 1/1989 | Billinger et al. |
| 5,138,650 | 8/1992 | Stahl et al. |
| 5,146,490 | 9/1992 | Beckman |
| 5,241,588 | 8/1993 | Babson, III et al. |
| 5,287,270 | 2/1994 | Hardy et al. |
| 5,287,403 | 2/1994 | Atkins et al. |
| 5,365,046 | 11/1994 | Haymann |
| 5,371,797 | 12/1994 | Bocinsky |
| 5,388,212 | 2/1995 | Grube et al. |
| 5,448,760 | 9/1995 | Frederick ........................... 455/56.1 |
| 5,475,740 | 12/1995 | Biggs et al. |
| 5,577,103 | 11/1996 | Foti ...................................... 379/59 |
| 5,613,213 | 3/1997 | Naddell et al. ..................... 455/54.1 |

Primary Examiner—Curtis Kuntz
Assistant Examiner—Duc Nguyen

[57] ABSTRACT

The apparatus and method of the present invention provide passive information access for use in a service subscription system having a service provider and at least one subscriber unit. The passive information access system includes a database, a receiver for detecting initialization signals from a subscriber unit, a host computer for identifying the subscriber unit based on the detected initialization signals, accessing from the database subscriber information specific to the identified subscriber unit, and presenting at least a portion of the accessed subscriber information to the identified subscriber unit. Thus, when the subscriber turns on the subscriber unit, a portion of the relevant subscriber information is passively displayed on a display or announced by a voice activator. Additionally, the host computer detects termination signals from the subscriber unit and updates the subscriber information following the termination. Furthermore, the subscriber can specify in advance the portion of the subscriber information to be presented.

20 Claims, 4 Drawing Sheets

| SUBSCRIBER UNIT IDENTIFICATION | TOTAL USAGE AMOUNT | FREE USAGE AMOUNT | SPECIAL USAGE AMOUNT |
|---|---|---|---|
| 908-222-7651 | 0 HR 35 MIN | 0 HR 30 MIN | 0 HR 10 MIN |
| 301-333-9201 | 1 HR 10 MIN | 0 HR 30 MIN | 0 HR 14 MIN |
| 703-437-4444 | 1 HR 40 MIN | 1 HR 0 MIN | 0 HR 15 MIN |
| 707-333-1524 | 0 HR 55 MIN | 1 HR 0 MIN | 0 HR 15 MIN |
| 301-444-2479 | 0 HR 40 MIN | 0 HR 0 MIN | 0 HR 15 MIN |

*FIG. 4*

PASSIVE INFORMATION ACCESS SYSTEM

BACKGROUND OF THE INVENTION

1. Technical Field

This disclosure relates to a class of add-on subscriber services that is applicable to communication, banking and entertainment purposes. More particularly, the disclosure relates to a passive information service where the passive information is updated and provided to the user.

2. Description of the Related Art

Generally, wireless mobile telephone systems, credit card systems or interactive television systems comprise a central or distributed service provider connected to a plurality of subscribers for providing services such as telephone connections or pay-per-view. The service provider includes equipment for performing various tasks that include subscriber data collection, usage authentication, data processing, customer service, billing and accounting. For example, the interactive television systems include a communication network to carry signals from the cable headend to distribution hubs, from which the signals are sent through trunks, feeder and drop cables to subscribers. The interactive television systems also include processors for billing and accounting at the headend. Similar system arrangement exists in the credit card systems where telephone transmission lines are used to communicate with point-of-sale terminals located at subscriber's premises and a host computer is used to verify proper authorization and process billing information. In a wireless mobile telephone system, a call originated from a cellular phone is picked up by receiving circuitry in a cell cite in the vicinity of the cellular phone and routed via land-line trunk to a mobile communication switching system, and eventually sent to a telephone network. The accounting and billing information for subscribers are usually stored and processed in a host computer connected to the switching system. In a typical cellular telephone system, the switching system establishes communication with the host computer once every twelve to twenty-four hours to download the records of calls stored in the switching system during the time period.

For limiting unauthorized cellular calls, some cellular service providers monitor unusual cellular activities, such as numerous calls within a short span of time. In such monitoring process the switching system may download accessed data more frequently than twelve to twenty-four hour intervals.

U.S. Pat. No. 5,241,588 and U.S. Pat. No. 5,345,380 disclose a method and apparatus for providing user selectable customized telephone services. A subscriber can customize his telephone services including call screening and call waiting. For example, the subscriber may specify a time period in which call screening is to be in effect. The customized services described therein, however, do not include access to the information relating to the subscriber's personal account stored in the telephone network.

Normally, a subscriber does not check on his account information unless he suspects that a problem exists with the telephone bill or that there was unauthorized usage. For the most part, fraudulent or unauthorized usage pass undetected until the receipt of the monthly bills. Other than the billing statements received from the service provider, a subscriber may only access his account information through a customer representative of the telephone service provider. Upon receipt of such requests, the customer representative accesses the subscriber account database located in the switching system to provide requested information, such as billing or accrued charges to the subscriber.

U.S. Pat. No. 5,146,490 to Beckman proposes a passive telephone call logging system which time stamps incoming and outgoing telephone calls. This system attempts to eliminate the process of having to contact the service provider for access to the current account information. The system includes a display that displays the number dialed and the elapsed time of the call in continuously updated format. The display format can also be individually customized to show only the requested information. The Beckman system discloses that the subscriber station at the subscriber's premise includes processor and memory means for processing and updating the call and time information.

SUMMARY OF THE INVENTION

The apparatus according to the present invention provides a passive information access system for use in a service subscription system having a service provider and at least one subscriber unit. The passive information system includes a database for storing subscriber information specific to a subscriber and a receiver for detecting initialization signals from a subscriber unit when the respective subscriber unit is activated. The passive information access system also includes a host computer for identifying the activated subscriber unit from the detected initialization signals, accessing from the database subscriber information specific to the identified subscriber unit, and presenting at least a portion of the accessed subscriber information to the identified subscriber unit.

BRIEF DESCRIPTION OF THE DRAWINGS

In the drawings:

FIG. 4 is a table containing cellular usage data in a subscriber information database in the cellular network.

DETAILED DESCRIPTION OF THE PREFERRED EMBODIMENTS

Figure 1:
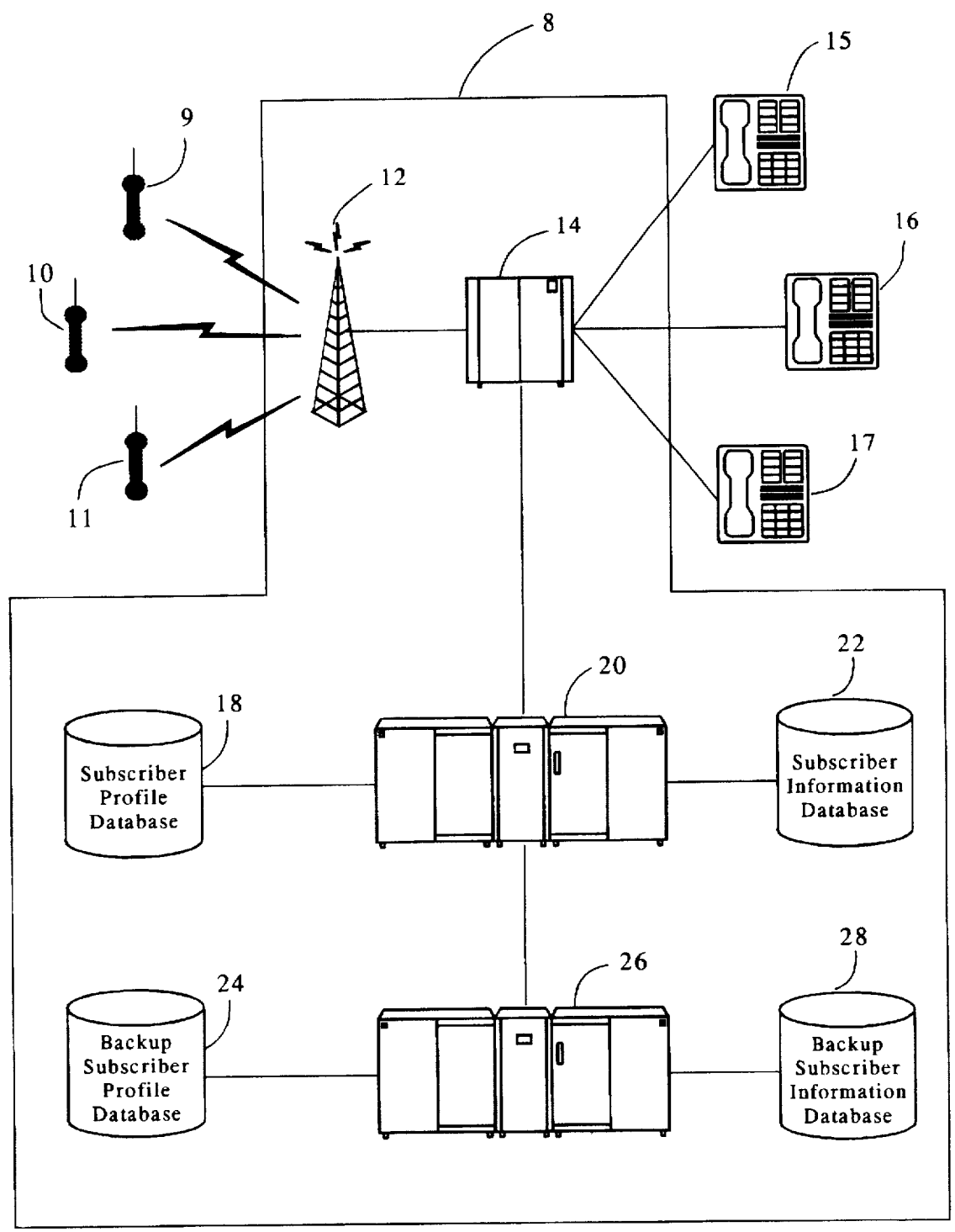
FIG. 1 is a block diagram illustrating a wireless mobile telephone network including a passive information access system of the present invention.

According to a preferred embodiment of the present invention, FIG. 1 illustrates a cellular network that includes a passive information access system. As used in this application, "subscriber" and "caller" refer to the entity for which a subscriber service is provided, and "service provider" refers to the entity which normally provides a subscribed service to a plurality of subscribers and includes means for implementing the passive information access. The cellular network includes a service provider 8, which includes a cellular base station 12, a switching system 14, a subscriber profile database 18, a host computer 20, a subscriber information database 22, a backup subscriber profile database 24, a backup host computer 26 and a backup subscriber information database 28. The service provider 8 that can be either centralized or distributed communicates with cellular phones 9, 10, 11 and the receiving phones 15, 16, 17. The passive information access system includes all the components of the cellular network except the receiving phones 15, 16, 17.

Each of the cellular phones 9, 10, 11 or subscriber units preferably includes a display such as a liquid crystal display (LCD) or light-emitting diode (LED) display. The cellular base station 12 comprises antennas and radios to communicate with the cellular phones 9, 10, 11. The cellular base station 12 also comprises transmission equipment which is connected to the switching system 14 via one or more conventional trunks. The switching system 14 performs call processing functions for the cellular phones 9, 10, 11 and the receiving phones 15, 16, 17. The switching system 14, handles the dialed numbers and connects the calls to the receiving phones 15, 16, 17. The switching system may be located in a network provided by a cellular telephone company or a local exchange carrier (LEC) such as one of the Regional Bell Operating Companies. Alternatively, the switching system 14 may be one provided by a long distance carrier such as AT&T. Further, the switching system 14 may include subscriber profile database 18, the host computer 20 and the subscriber information database 22. The host computer 20 operates in connection with the subscriber information database 22 and subscriber profile database 18. The host computer 20 and the backup host computer 26 basically serve in the same manner to process, store, update and retrieve necessary data in a fraction of a second needed to complete a call. The subscriber information database 22 maintains, among other data, subscriber unit identifications, usage information including accumulated calls since the last billing period for each of the cellular phones 9, 10, 11 and the outstanding amount for each of the cellular phones 9, 10, 11. All of such data can be displayed by the passive information access system to the subscriber each time the subscriber turns on the cellular phone 9, 10, 11. Alternatively, the subscriber profile database 18 maintains presentation formats for each of the cellular phones 9, 10, 11 where the presentation formats, such as a certain portion of data, can be prespecified by subscribers. The backup databases 24 and 28 basically maintain the same information as the databases 18 and 22. The databases 18, 22, 24 and 28 may be partitioned into different memory areas allocated to each of the cellular phones 9, 10, 11.

Figure 2:
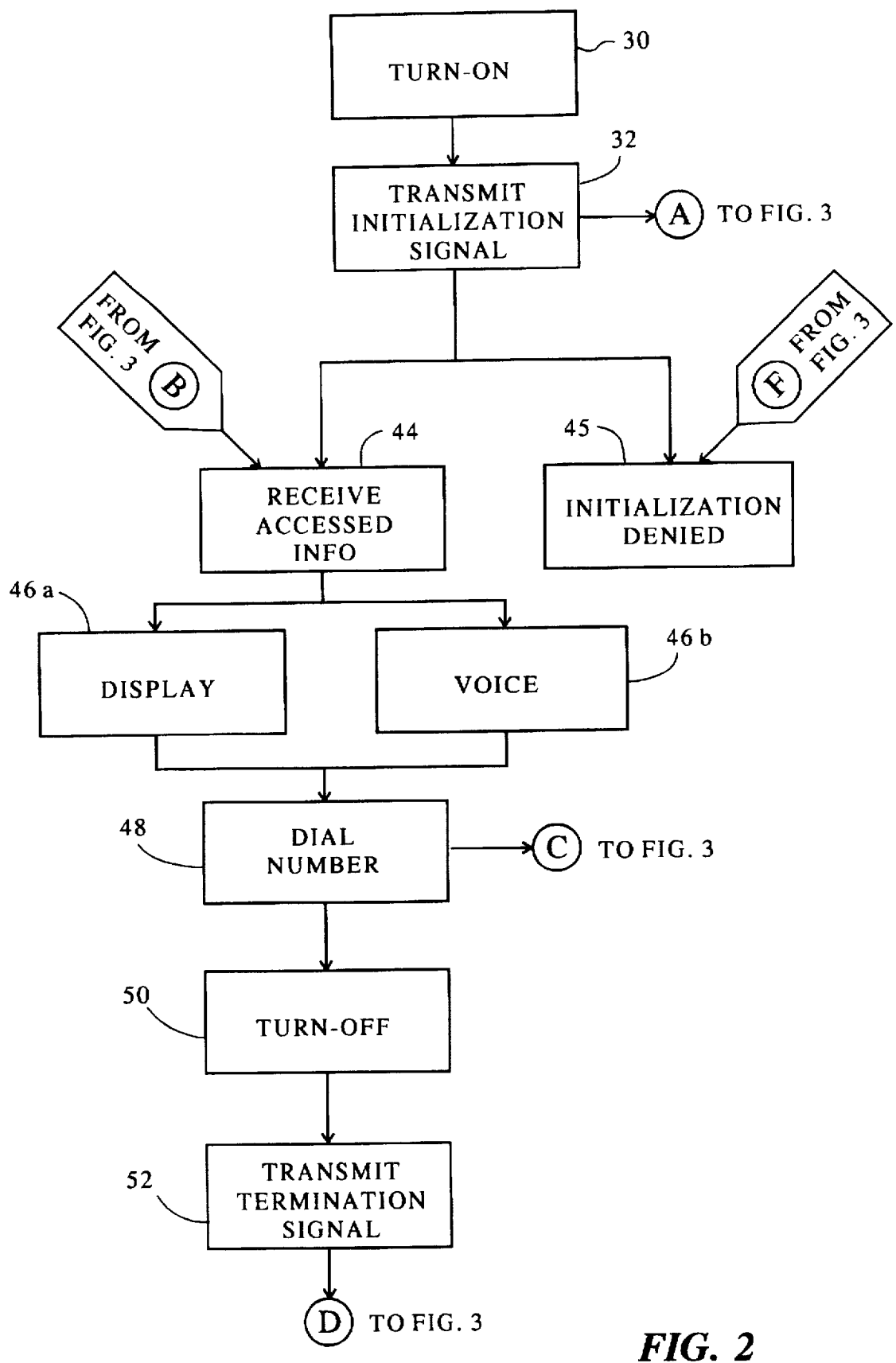
FIG. 2 shows a flow chart illustrating the operation of a cellular phone in connection with the passive information access system as shown in FIG. 3.
Figure 3:
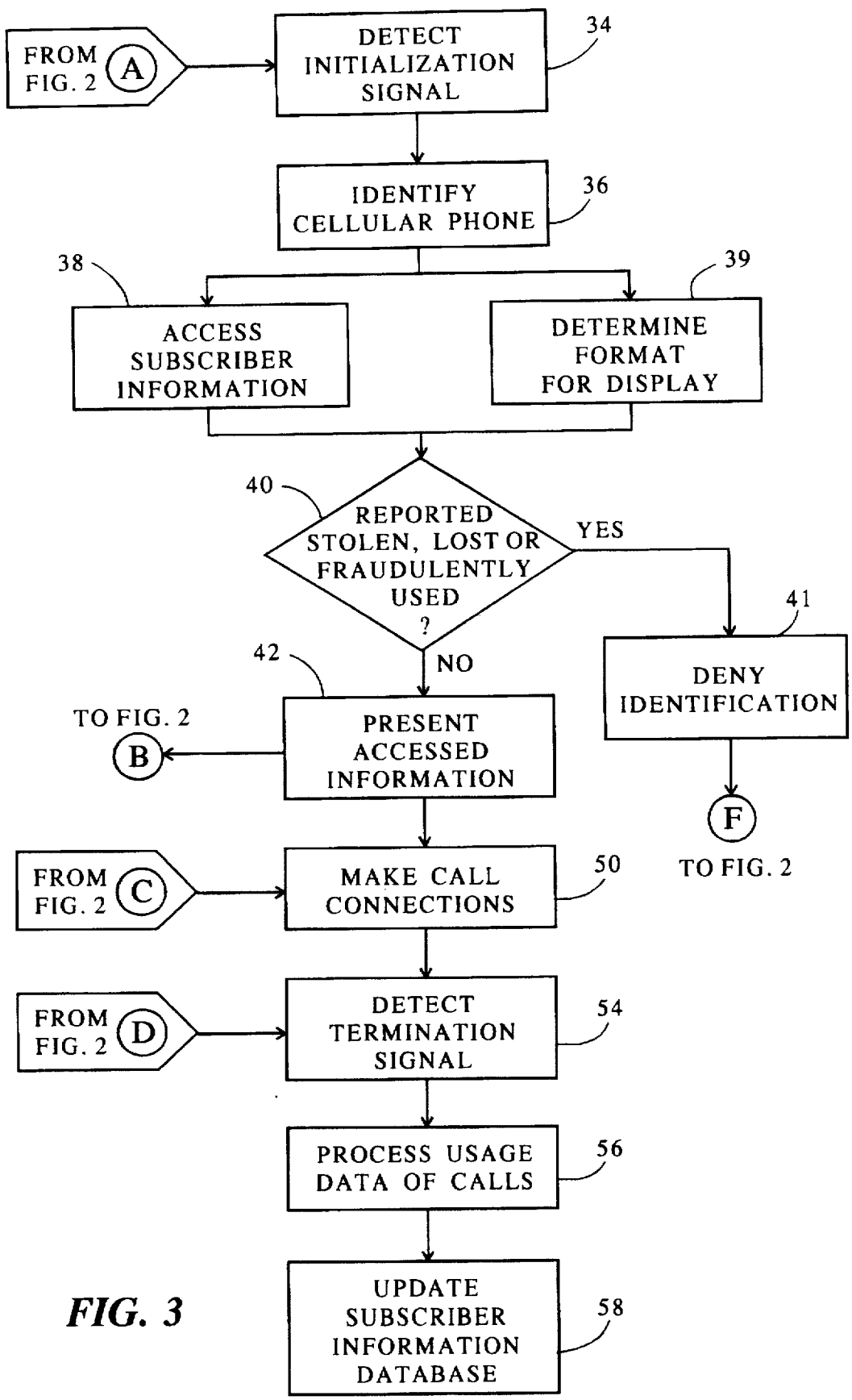
FIG. 3 shows a flow chart illustrating the operation of the passive information access system in connection with the operation of the cellular phone as shown in FIG. 2.

FIG. 2 and 3 are flow charts illustrating the operation of the passive information access system in connection with one of the cellular phones 9, 10, 11. More specifically, FIG. 2 illustrates the operation steps processed in a cellular phone 10 and FIG. 3 illustrates the operation steps processed in the service provider 8. When a cellular phone 10 is turned on (step 30), the cellular phone 10 periodically transmits initialization signals, including service provider and subscriber unit identification codes to the service provider 8 (step 32). The cellular base station 12 of the service provider 8 detects the initialization signals and sends the signals to the host computer 20. The host computer 20 then identifies the cellular phone 10 and the subscriber associated with the cellular phone 10 by extracting the subscriber unit identification code from the detected initialization signals (step 36). Such identification code scheme is commonly used in the present cellular phone systems. As a part of this identification scheme, the host computer 20 accesses the subscriber information database 22 and retrieves the usage information specific to the identified cellular phone 10 in order to verify the identified subscriber's account (step 38). For example, if the subscriber of the cellular phone 10 reports unauthorized usage such as theft, loss or fraudulent usage of the cellular phone 10 to the service provider 8, then such records along with the cellular phone identification are stored in the subscriber information database 22. Thereafter, when the cellular phone 10 is turned on, the service provider 8 identifies the cellular phone 10 along with the accessed information reflecting the unauthorized usage (step 40). The service provider will operate under a prearranged fraud protection mode such as initiate an inquiry process or deny the initialization attempt (steps 41, 45).

During the identification verifying process, the passive information access system of the present invention may utilize the retrieved usage information from the subscriber information database 22 to provide the desired portion of the usage information to the identified cellular phone 10. In order to present the specific portion of the usage information desired by the subscriber, the host computer 20 retrieves a predetermined presentation format from the subscriber profile database 18 (step 39). The predetermined presentation format can be chosen in advance by the subscriber of the cellular service, for instance, at the time of a cellular service subscription sign-up. At such time, the subscriber chooses a certain portion of the usage information for presentation so that such portion is presented whenever the cellular phone 10 is turned on. For example, the subscriber can choose the number of minutes used since the last billing period to be presented. The cellular service provider 8 then stores the chosen presentation format in the subscriber profile database 18. The mode of presentation may also be predetermined so that the subscriber has options between a display on a screen on the cellular phone 10 and an audio announcement, preferably from a voice converter. The display on the screen of the cellular phone 10 can use either LCD or LED display. The voice converter is one type of digital signal processors well-known in the art for converting digital signals into voice signals. The subscriber information in the predetermined format is transmitted to the cellular phone 10 (step 42) and received by the cellular phone 10 (step 44). The presentation is then made either in display, voice or both modes (steps 46a and 46b). Based on the presented information, the subscriber can track his account usage and detect fraudulent activities. For example, the subscriber can contact the cellular service provider 8 to close his cellular account when the presented information includes records of calls he has not made.

After the presentation of the accessed information, the subscriber dials phone numbers he wants to call (step 48). The switching system 14 in the cellular network will connect the calls to the receiving phones 16 (step 50). For billing purposes, the host computer 20 may time-stamp at the beginning and end of each call. When the cellular phone 10 is turned off (step 50), the cellular phone 10 transmits termination signals (step 52). The cellular base station 12 detects the termination signals and sends these signals to the host computer 20 via the switching system 14 (step 54). The host computer 20 then processes usage data related to the series of calls just ended (step 56). Alternatively, the host computer 20 may process usage data on each cell. Based on the processed usage data, the usage information in the subscriber information database 22 is updated (step 58). For example, the number of minutes of total usage may be increased by the duration of these calls. At the same time, the number of free minutes remaining from a monthly service plan may be decreased by the duration of the calls.

FIG. 4 illustrates an example of data stored in the subscriber information database 22, which may be in a table format having columns and rows. The table 60 may include a subscriber unit identification number 62, total usage amount 64 indicating the total number of minutes of cellular service used since the last billing period, and free usage amount 66 indicating the number of free minutes remaining from a monthly service plan. The total usage amount 64 is generally reset to zero at the end of each billing period, such as every month, by transferring a balance to an account report. Thus, at the beginning of each month, the number of minutes of total usage is set back to zero. Alternatively, the total usage amount 64 can be reset when the bill for the subscriber is paid. Typically, cellular service providers, in promotional programs, offer monthly service plans wherein a certain number of minutes is included free. The free usage amount 66 also can be personally determined by each subscriber by pre-paying the desired amount. The column for special usage amount 68 can be used if some specific information is desired by the subscriber. For example, the special usage amount 68 may be designated as the total number of minutes of long distance calls made since the last billing period.

The subscriber may specify any portion of the above information to be presented. One benefit of such presentation is that keeping track of the cellular phone usage becomes a much easier task when the subscriber automatically receives his usage information each time he turns on the cellular phone 10. For instance, the total number of minutes that the cellular service is used since the last billing period, the number of free minutes remaining from the monthly service plan, or the total number of minutes of the long distance calls, may be presented. The subscriber can also specify the recent activities in his cellular account to be added in an additional column and to be presented when he turns on the cellular phone 10 so that the subscriber would be in a better position to become aware of any fraudulent activity. For example, the duration of each of the last five calls or the phone numbers to which the last five calls were made, may be presented.

While the invention has been described particularly with reference to the cellular phone network, the passive information access system in the present invention can be applied to other communication services. For instance, in a cable or interactive television, a summary of the current pending charges or any other information about the subscriber's usage such as accumulated usage of the pay-per-view programs and interactive television services, or even the national average viewing time can be selected by the subscriber for display.

Additionally, the passive information access system can be implemented in conjunction with a credit card service. Credit card companies currently maintain a billing database for authorization purposes. To this database, some additional information may be added and used for the passive information access system. For example, the number of transactions since the last billing date, the place of the last purchase or the cumulative amount of charges made since the last billing period can be provided along with an authorization return. Such information not only provides a basis of usage-check but also alerts the credit card users to fraudulent use of the credit card. The information may be updated after each transaction at the same time as the credit balance is updated.

What has been described here is merely illustrative of other arrangements and methods that may be implemented by those skilled in the art. Accordingly, it is intended by the appended claims to cover all modifications of the invention that fall within the true spirit and scope of the invention.

What is claimed is:

1. A passive information access system for use in a service subscription system having a service provider and at least one subscriber unit, said passive information system comprising:

a database for storing subscriber information specific to said at least one subscriber unit;

detecting means for detecting at least one initialization signal from said at least one subscriber unit when said at least one subscriber unit is activated;

identifying means for identifying said at least one activated subscriber unit from said at least one detected initialization signal;

accessing means for accessing from said database subscriber information specific to said at least one identified activated subscriber unit; and presenting means for presenting at least a portion of said accessed subscriber information to said at least one identified activated subscriber unit substantially upon activation of said at least one identified subscriber unit.

2. A system in claim 1, wherein said presenting means includes a display for displaying said at least a portion of said accessed subscriber information.

3. A system in claim 1, wherein said presenting means includes a voice converter for converting digital signals of said at least a portion of said accessed subscriber information into voice signals.

4. A system in claim 1, further comprising:

means for storing records of unauthorized usage in said database when said at least one subscriber unit notifies said subscriber provider of said unauthorized usage; and means for denying initialization of said at least one subscriber unit when said accessed subscriber information specific to said at least one identified subscriber unit includes said records of said unauthorized usage.

5. A system in claim 1, further comprising:

connecting means for making service connections upon requests from said at least one subscriber unit;

said detecting means for further detecting at least one termination signal from said at least one subscriber unit when said at least one respective subscriber unit is deactivated; and processing means for processing usage data related to said service connections for said at least one respective subscriber unit upon said detection of said at least one termination signal and for updating said accessed subscriber information based on said processed usage data related to said service connections.

6. A system in claim 1, further comprising means for predetermining said portion of said accessed subscriber information to be presented for said at least one subscriber unit in accordance with a selection by said at least one respective subscriber unit.

7. A system in claim 1, wherein said service provider provides telephone services and said subscriber information specific to said at least one subscriber unit includes subscriber unit identification and usage information including calls accumulated during a billing period and usage amount outstanding in said billing period.

8. A system in claim 1, wherein said service provider provides credit card services and said subscriber information specific to said at least one subscriber unit includes subscriber unit identification and usage information including transactions accumulated during a billing period and total usage amount outstanding in said billing period.

9. A system in claim 1, wherein said service provider provides television services and said subscriber information specific to said at least one subscriber unit includes subscriber unit identification and usage information including ordered services accumulated during a billing period and usage amount outstanding in said billing period.

10. A passive information access system for use in a service subscription system having a service provider and at least one subscriber unit, said passive information system comprising:

a database for storing subscriber information specific to said at least one subscriber unit;

a receiver for detecting at least one initialization signal from said at least one subscriber unit when said at least one subscriber unit is activated; and a host computer for identifying said at least one activated subscriber unit from said at least one detected initialization signal, for accessing from said database subscriber information specific to said at least one identified activated subscriber unit and for presenting at least a portion of said accessed subscriber information to said at least one identified activated subscriber unit substantially upon activation of said at least one identified subscriber unit.

11. A system in claim 10, further comprising said host computer for storing records of unauthorized usage in said database when said at least one subscriber unit notifies said subscriber provider of said unauthorized usage and for denying initialization of said at least one subscriber unit when said accessed subscriber information specific to said at least one identified subscriber unit includes said records of said unauthorized usage.

12. A system in claim 10, further comprising:

a switching system having said database and said host computer and configured for making service connections upon requests from said at least one subscriber unit;

said receiver for further detecting at least one termination signal from said at least one subscriber unit when said at least one respective subscriber unit is deactivated; and said host computer for further processing usage data related to said service connections for said at least one respective subscriber unit upon said detection of said at least one termination signal and for updating said accessed subscriber information based on said processed usage data related to said service connections.

13. A system in claim 10, wherein said host computer predetermines said portion of said accessed subscriber information to be presented for said at least one subscriber unit in accordance with a selection by said at least one respective subscriber unit.

14. A system in claim 10, wherein said service provider provides telephone services and said subscriber information specific to said at least one subscriber unit includes subscriber unit identification and usage information including calls accumulated during a billing period and usage amount outstanding in said billing period.

15. A system in claim 10, wherein said service provider provides credit card services and said subscriber information specific to said at least one subscriber unit includes subscriber unit identification and usage information including transactions accumulated during a billing period and usage amount outstanding in said billing period.

16. A system in claim 10, wherein said service provider provides television services and said subscriber information specific to said at least one subscriber unit includes subscriber unit identification and usage information including ordered services accumulated during a billing period and usage amount outstanding in said billing period.

17. A method for providing passive information access in a service subscription system having a service provider and at least one subscriber unit comprising the steps of:

storing subscriber information specific to said at least one subscriber unit in a database;

detecting at least one initialization signal from said at least one subscriber unit when said at least one subscriber unit is activated;

identifying said at least one activated subscriber unit from said at least one detected initialization signal;

accessing from said database subscriber information specific to said at least one identified activated subscriber unit; and presenting at least a portion of said accessed subscriber information to said at least one identified activated subscriber unit substantially upon activation of said at least one identified subscriber unit.

18. A method in claim 17, further comprising the steps of storing records of unauthorized usage in said database when said at least one subscriber unit notifies said subscriber provider of said unauthorized usage and denying initialization of said at least one subscriber unit when said accessed subscriber information specific to said at least one identified subscriber unit includes said records of said unauthorized usage.

19. A method in claim 17, further comprising the steps of:

making service connections upon requests from said at least one subscriber unit;

detecting at least one termination signal from said at least one subscriber unit when said at least one respective subscriber unit is deactivated;

processing usage data related to said service connections for said at least one respective subscriber unit upon said detection of said at least one termination signal; and updating said accessed subscriber information based on said processed usage data related to said service connections.

20. A method in claim 17, further comprising the step of predetermining said portion of said accessed subscriber information to be presented for said at least one subscriber unit in accordance with a selection by said at least one respective subscriber unit.

* * * * *